(12) United States Patent
Wang

(10) Patent No.: US 9,973,030 B2
(45) Date of Patent: May 15, 2018

(54) WIRELESS CHARGING DEVICE

(71) Applicant: HUIZHOU TCL MOBILE COMMUNICATION CO., LTD., Huizhou (CN)

(72) Inventor: Jiang Wang, Huizhou (CN)

(73) Assignee: HUIZHOU TCL MOBILE COMMUNICATION CO., LTD., Shenzhen, Guangdong (CN)

( * ) Notice: Subject to any disclaimer, the term of this patent is extended or adjusted under 35 U.S.C. 154(b) by 248 days.

(21) Appl. No.: 14/912,153

(22) PCT Filed: Jul. 29, 2015

(86) PCT No.: PCT/CN2015/085448
§ 371 (c)(1),
(2) Date: Feb. 15, 2016

(87) PCT Pub. No.: WO2016/138735
PCT Pub. Date: Sep. 9, 2016

(65) Prior Publication Data
US 2017/0005502 A1 Jan. 5, 2017

(30) Foreign Application Priority Data
Mar. 3, 2015 (CN) .......................... 2015 1 0094045

(51) Int. Cl.
*H02J 7/00* (2006.01)
*H02J 7/02* (2016.01)

(52) U.S. Cl.
CPC ................ *H02J 7/025* (2013.01); *H02J 7/02* (2013.01)

(58) Field of Classification Search
USPC ....................................................... 320/108
See application file for complete search history.

(56) References Cited

U.S. PATENT DOCUMENTS

| | | | |
|---|---|---|---|
| 7,375,492 B2 | 5/2008 | Calhoon et al. | |
| 2014/0333142 A1* | 11/2014 | Desrosiers | H02J 7/025 307/104 |
| 2015/0028673 A1* | 1/2015 | Uchida | H02J 7/025 307/31 |

FOREIGN PATENT DOCUMENTS

| | | |
|---|---|---|
| CN | 103094965 A | 5/2013 |
| CN | 103972970 A | 8/2014 |
| CN | 104205901 A | 12/2014 |
| CN | 104701955 A | 6/2015 |

* cited by examiner

*Primary Examiner* — Robert Grant
(74) *Attorney, Agent, or Firm* — Shimokaji & Associates, P.C.

(57) ABSTRACT

Disclosed is a wireless charging device, including: an oscillating module, a rectifier voltage reduction module, a power management module, and a Bluetooth communications module, wherein the Bluetooth communications module communicates with a charging socket to acquire a charging communications protocol, the oscillating module receives a signal from the charging socket and oscillates to generate AC, the rectifier voltage reduction module rectifies and reduces the voltage of the AC and then outputs a DC reference voltage, and the power management module reduces the reference voltage and then outputs a charging voltage to charge a battery.

18 Claims, 3 Drawing Sheets

WIRELESS CHARGING DEVICE

TECHNICAL FIELD

The present invention relates to the field of the wireless charging technology, and more particularly, to a wireless charging device.

BACKGROUND

A wearable device, such as an X-Watch, needs to have capabilities for wireless charging in addition to supporting other functions (for example, various sensor and Bluetooth functions) typically found in most current smart watches. At present, there are two standards in consumer electronics for wireless charging: Qi magnetic induction and A4WP (Alliance for Wireless Power) magnetic resonance. Although the two standards have many advantages, they need to be improved as far as the current technology is concerned.

In addition, the area of the PCB board of a wearable device, such as an X-Watch may typically be about 30 mm×17 mm. Given the need to support multiple functions, it is a very daunting challenge to set a wireless charging part so as to reasonably use the limited space of the PCB board. The current A4WP magnetic resonance technology is not yet mature, and a wireless charging module occupies much space of the PCB board. Therefore, real wireless charging cannot be achieved unless wireless charging hardware circuits are streamlined and practicable in design.

Therefore, the prior art needs to be improved and developed.

SUMMARY

In view of the foregoing defects of the prior art, the technical problem to be solved by the present invention is to provide a wireless charging device intended to solve the problem that an existing wireless charging module occupies much space of a PCB board.

In order to solve the technical problem, the present invention adopts the following technical solution.

A wireless charging device may be connected to a charging socket and a battery, and includes: an oscillating module, a rectifier voltage reduction module, a power management module, and a Bluetooth communications module, where the oscillating module, the rectifier voltage reduction module, and the power management module may be are sequentially connected; the Bluetooth communications module may be connected with the rectifier voltage reduction module; and the power management module may be connected with the battery. The Bluetooth communications module may communicate with the charging socket to acquire a charging communications protocol, the oscillating module may receive a signal from the charging socket and oscillate to generate AC, the rectifier voltage reduction module may rectify and reduce the voltage of the AC and then output a DC reference voltage, and the power management module may reduce the reference voltage and then outputs a charging voltage to charge the battery.

In the wireless charging device, the oscillating module may include a first antenna, a second antenna, a first capacitor, a second capacitor, a third capacitor, a fourth capacitor and a fifth capacitor; the first antenna may be connected to one end of the first capacitor, the other end of the first capacitor may be connected to one end of the fifth capacitor and the rectifier voltage reduction module, the second capacitor may be connected in parallel with the first capacitor, the second antenna may be connected to one end of the third capacitor, the other end of the third capacitor may be connected to the other end of the fifth capacitor and the rectifier voltage reduction module, and the fourth capacitor may be connected in parallel with the third capacitor.

In the wireless charging device, the rectifier voltage reduction module may includes a resonance chip and an inductor. An AC+ terminal of the resonance chip may be connected to the other end of the first capacitor and one end of the fifth capacitor. An AC− terminal of the resonance chip may be connected to the other end of the third capacitor and the other end of the fifth capacitor. An SW terminal of the resonance chip may be connected to one end of the inductor, while the other end of the inductor may be connected to the power management module. A TEMP terminal of the resonance chip may be connected to the Bluetooth communications module. A PVIN terminal of the resonance chip may be connected to a power supply terminal, and both a PGND terminal and a PGND2 terminal of the resonance chip may be grounded.

In the wireless charging device, the rectifier voltage reduction module may further include: a first protection circuit; a second protection circuit; and a detection circuit, wherein the detection circuit may be connected to the resonance chip, the first protection circuit, and the second protection circuit; both the first protection circuit and the second protection circuit may respectively be connected to the oscillating module, wherein when the detection circuit detects that a voltage of the resonance chip is greater than a preset voltage, the detection circuit may output a buck signal to the first protection circuit and the second protection circuit, so that the first protection circuit and the second protection circuit may reduce the voltage of the oscillating module.

In the wireless charging device, the first protection circuit may include a first MOS transistor and a sixth capacitor; a gate of the first MOS transistor may be connected to the detection circuit; a drain of the first MOS transistor may be connected to the first antenna and one end of the first capacitor by means of the sixth capacitor; and a source of the first MOS transistor may be grounded.

In the wireless charging device, the second protection circuit may include a second MOS transistor and a seventh capacitor; a gate of the second MOS transistor may be connected to the detection circuit; a drain of the second MOS transistor may be connected to the second antenna and one end of the third capacitor by means of the seventh capacitor; and a source of the second MOS transistor may be grounded.

In the wireless charging device, the detection circuit may include a first resistor, a second resistor, an eighth capacitor, and an inverter; one end of the first resistor may be connected to the gate of the first MOS transistor and the gate of the second MOS transistor; the other end of the first resistor may be connected to a B2 pin of the inverter; a B1 pin of the inverter may be grounded; an A1 pin of the inverter may be connected to a CLAMP1 terminal of the resonance chip and one end of the second resistor; an A2 pin of the inverter may be connected to the power supply terminal and the other end of the second resistor; and the A2 pin of the inverter may also be grounded by means of the eighth capacitor.

In the wireless charging device, the rectifier voltage reduction module may further include a temperature detecting circuit configured to detect the temperature of the resonance chip and transmit it to the Bluetooth communications module for temperature monitoring, and the temperature detecting circuit may include a third resistor, a fourth resistor, a fifth resistor, a sixth resistor and a ninth capacitor; one end of the third resistor may be connected to a TEMP pin of the resonance chip, one end of the fourth resistor and one end of the fifth resistor; one end of the ninth capacitor may be connected to one end of the fourth resistor and the Bluetooth communications module; the other end of the third resistor, the other end of the fourth resistor, and the other end of the ninth capacitor may be respectively grounded; and the other end of the fifth resistor may be connected to a VLDO terminal of the resonance chip, and may be connected to the Bluetooth communications module by means of the sixth resistor.

In the wireless charging device, the rectifier voltage reduction module may further include a current detecting circuit; the current detecting circuit may include a seventh resistor; one end of the seventh resistor may be connected to a VRECTS1 terminal and a VRECT terminal of the resonance chip, and the other end of the seventh resistor may be connected to a VRECTS2 terminal and a PVIN terminal of the resonance chip.

In the wireless charging device, the power management module may include a charging chip, an eighth resistor, a ninth resistor, a tenth resistor, an eleventh resistor, a twelfth resistor, a thirteenth resistor, a tenth capacitor and an eleventh capacitor; an OUT pin of the charging chip may be connected to the battery and may also be grounded by means of the tenth capacitor; a TS pin of the charging chip may be grounded by means of the eighth resistor; a PRE_TERM pin of the charging chip may be grounded by means of the ninth resistor; an ISET pin of the charging chip may be grounded by means of the tenth resistor; a VSS pin of the charging chip may be grounded; an IN pin of the charging chip may be connected to the other end of the inductor and one end of the eleventh resistor and may also be grounded by means of the eleventh capacitor; the other end of the eleventh resistor may be connected to one end of the twelfth resistor and a master controller; and the other end of the twelfth resistor may be grounded by means of the thirteenth resistor.

Compared with the prior art, in the wireless charging device provided by the present invention, the Bluetooth communications module communicates with the charging socket to acquire a charging communications protocol, the oscillating module receives a signal from the charging socket and oscillates to generate AC, the rectifier voltage reduction module rectifies and reduces the voltage of the AC and then outputs a DC reference voltage, and the power management module reduces the reference voltage and then outputs a charging voltage to charge the battery; the wireless charging device only needs to occupy an area of not more than 8 mm×8 mm on the PCB board (the occupied area may be very small), and may further be conveniently integrated into an existing portable smart wearable device, thereby implementing wireless charging and achieving the objective of streamlining the design of a charging circuit.

DETAILED DESCRIPTION OF THE EMBODIMENTS

The present invention provides wireless charging device, which is applicable to terminal consumer electronics, wearable devices and daily used electronic products that need to be charged by a wireless power supply, for example, a wearable watch, a mobile phone and other portable products. Based on the A4WP wireless charging technology, in the present invention, an MAP7101 chip may be used to design hardware circuits for wireless charging control, and a peripheral circuit of the chip is optimized. The A4WP is a standard of wireless charging by magnetic resonance. The magnetic resonance principle is the same as the resonance principle of sound. If one of arrayed tuning forks having the same vibration frequency gives forth a sound, the other tuning forks may also give forth a sound due to resonance. Similarly, among coils having the same vibration frequency arrayed in a magnetic field, power can be supplied from one coil to another one. Compared with electromagnetic induction, magnetic resonance may extend over a further transmission distance. Different from the electromagnetic induction, the magnetic resonance does not need that a precise coil location. An energy sending device and an energy receiving device are required in the magnetic resonance. When the two devices are adjusted to the same frequency, or resonate at a preset frequency (6.78 MHz), the two devices may exchange energy with each other.

To make the objectives, technical solutions, and advantages of the present invention clearer, the following further describes in detail the present invention with reference to the accompanying drawings and embodiments. It is to be understood that the embodiments described herein are only intended to explain the present invention, and are not restrictive of the present invention.

Figure 1:
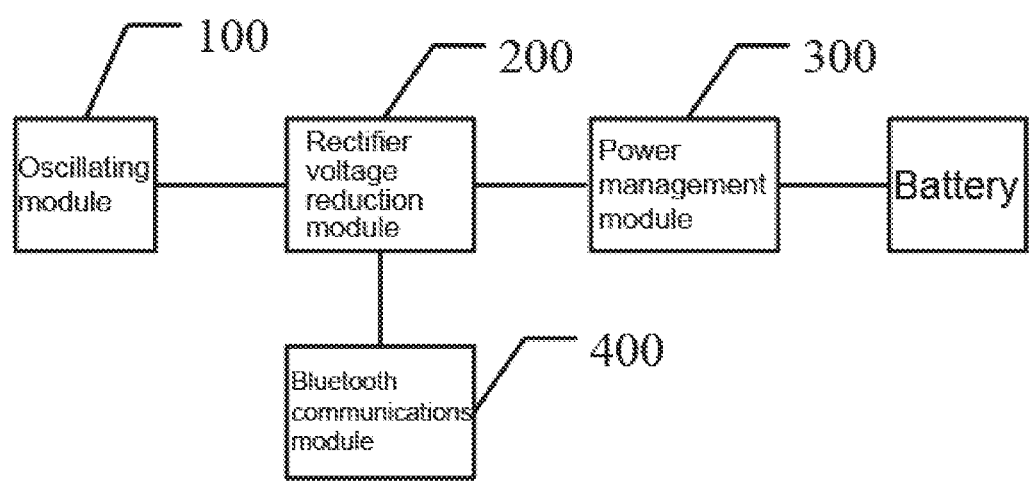
FIG. 1 is a structural diagram of the wireless charging device provided by the present invention.

Referring to FIG. 1, as a receiving end, the wireless charging device provided by the present invention is configured to wirelessly charge a battery, and a charging socket of the wireless charging system sends a signal having a preset frequency to the wireless charging device. In embodiments, the wireless charging device includes: an oscillating module 100, a rectifier voltage reduction module 200, a power management module 300, and a Bluetooth communications module 400, wherein the oscillating module 100, the rectifier voltage reduction module 200, and the power management module 300 may be sequentially connected; the Bluetooth communications module 400 may be connected with the rectifier voltage reduction module 200; and the power management module 300 may be connected with the battery.

A communication may be established between the Bluetooth communications module 400 and the charging socket via Bluetooth communication, and the Bluetooth communications module 400 acquires a required communications protocol (for example, charging power and temperature requirements) to control the whole charging process. The oscillating module 100 may receive a signal from the charging socket and may oscillate to generate AC (which results from the fact that the charging socket and the oscillating module 100 conduct a magnetic resonance to generate a frequency of 6.78 MHz which corresponds to that of the signal, and the magnetic field is converted into an electrical signal). The rectifier voltage reduction module 200 may rectify and reduce the voltage of the AC outputted by the oscillating module 100 and then output a DC reference voltage. The power management module 300 may reduce the reference voltage and then output a charging voltage to charge the battery.

Figure 2:
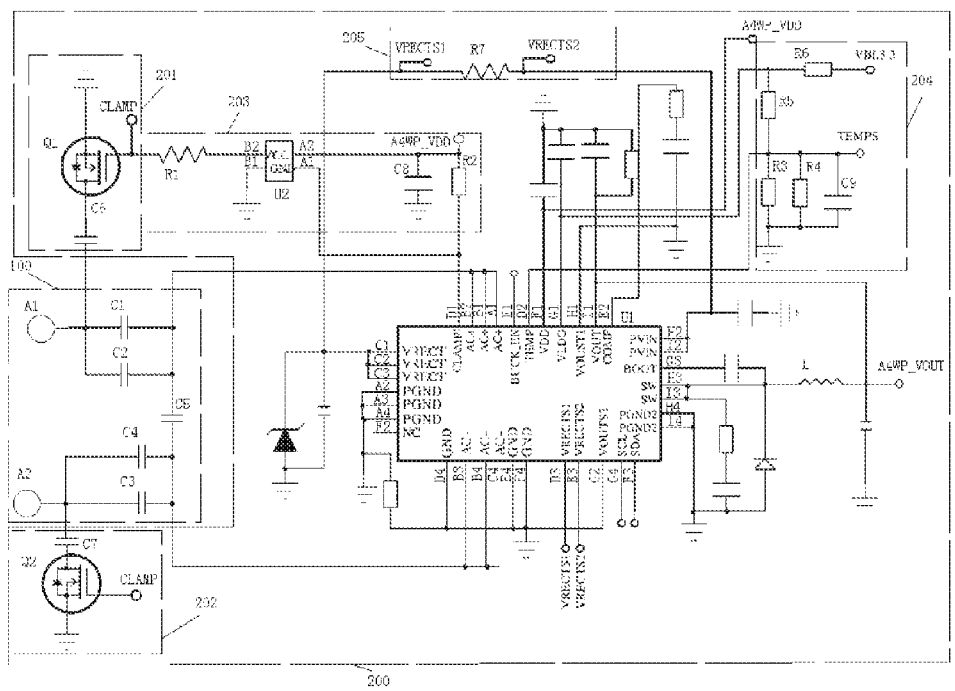
FIG. 2 is a circuit diagram of the oscillating module and the rectifier voltage reduction module in the wireless charging device provided by the present invention.

Referring to FIG. 2, the oscillating module 100 may include a first antenna A1, a second antenna A2, a first capacitor C1, a second capacitor C2, a third capacitor C3, a fourth capacitor C4, and a fifth capacitor C5; the first antenna A1 may be connected to one end of the first capacitor C1; the other end of the first capacitor C1 may be connected to one end of the fifth capacitor C5 and the rectifier voltage reduction module 200; the second capacitor C2 may be connected in parallel with the first capacitor C1; the second antenna A2 may be connected to one end of the third capacitor C3; the other end of the third capacitor C3 may be connected to the other end of the fifth capacitor C5 and the rectifier voltage reduction module 200; and the fourth capacitor C4 may be connected in parallel with the third capacitor C3.

The first antenna A1 and the second antenna A2 may act as inductors and may be configured to receive a signal from the charging socket. The first capacitor C1, the second capacitor C2, the third capacitor C3, the fourth capacitor C4, and the fifth capacitor C5 may be matched capacitors. The inductors and the capacitors may constitute an oscillating circuit to generate AC for the rectifier voltage reduction module.

The rectifier voltage reduction module may include a resonance chip U1 having a model of MAP7101 and an inductor L, an AC+ terminal of the resonance chip U1 may be connected to the other end of the first capacitor C1 and one end of the fifth capacitor C5, an AC− terminal of the resonance chip U1 may be connected to the other end of the third capacitor C3 and the other end of the fifth capacitor C5, an SW terminal of the resonance chip U1 may be connected to one end of the inductor L, the other end of the inductor L may be connected to the power management module 300, a TEMP terminal of the resonance chip U1 may be connected to the Bluetooth communications module 400, a PVIN terminal of the resonance chip U1 may be connected to a power supply terminal A4WP_VDD, and both a PGND terminal and a PGND2 terminal of the resonance chip U1 may be grounded.

The AC may be inputted from the AC+ terminal and the AC− terminal of the resonance chip U1, then rectified inside the resonance chip U1, and then reduced in DC-DC voltage, finally a reference voltage A4WP_VOUT having a voltage of 5V, the maximum power of 5 W and the maximum current of 1 A may be outputted from the SW terminal to the power management module 300.

In concrete implementation, in order to avoid burning the resonance chip U1 off by high voltage, the rectifier voltage reduction module 200 may further include: a first protection circuit 201, a second protection circuit 202, and a detection circuit 203. The detection circuit 203 may be connected to the resonance chip U1, the first protection circuit 201, and the second protection circuit 202; both the first protection circuit 201 and the second protection circuit 202 may be respectively connected to the oscillating module 100. When the detection circuit 203 detects that the voltage of the resonance chip U1 is greater than a preset voltage, a buck signal may be outputted to the first protection circuit 201 and the second protection circuit 202, so that the first protection circuit 201 and the second protection circuit 202 may reduce the voltage of the oscillating module 100.

The first protection circuit 201 may include a first MOS transistor Q1 and a sixth capacitor C6. The second protection circuit 202 may include a second MOS transistor Q2 and a seventh capacitor C7. The detection circuit 203 may include a first resistor R1, a second resistor R2, an eighth capacitor C8, and an inverter U2 having a model of SN74LVC1G04.

The gate of the first MOS transistor Q1 may be connected to one end of the first resistor R1, the drain of the first MOS transistor Q1 may be connected to the first antenna A1 and one end of the first capacitor C1 by means of the sixth capacitor C6, and the source of the first MOS transistor Q1 may be grounded.

The gate of the second MOS transistor Q2 may be connected to one end of the first resistor R1, the drain of the second MOS transistor Q2 may be connected to the second antenna A2 and one end of the third capacitor C3 by means of the seventh capacitor C7, and the source of the second MOS transistor Q2 may be grounded.

The other end of the first resistor R1 may be connected to the B2 pin of the inverter U2; the B1 pin of the inverter U2 may be grounded, the A1 pin of the inverter U2 may be connected to the CLAMP1 terminal of the resonance chip U1 and one end of the second resistor R2; the A2 pin of the inverter U2 may be connected to the power supply terminal A4WP_VDD and the other end of the second resistor R2; and the A2 pin of the inverter U2 may also be grounded by means of the eighth capacitor C8.

Both the first MOS transistor Q1 and the second MOS transistor Q2 may be NMOS transistors. When the resonance chip U1 works properly, the A2 pin of the inverter U2 has a high level voltage, and the B2 pin of the inverter U2 has a low level voltage, at the moment the first MOS transistor Q1 and the second MOS transistor Q2 are turned off. When the voltage in the resonance chip U1 is greater than a preset voltage, the CLAMP1 terminal of the resonance chip U1 may output a low level voltage to pull down the A2 pin of the inverter U2, the B2 pin of the inverter U2 may output a high level voltage to control the first MOS transistor Q1 and the second MOS transistor Q2 to be turned on, the sixth capacitor C6 and the seventh capacitor C7 may form a to-the-ground channel, and start to block DC and allow AC to pass through for discharging, so that the voltage of the resonance chip U1 is reduced.

In this embodiment, the rectifier voltage reduction module 200 may further include a temperature detecting circuit 204 configured to detect the temperature of the resonance chip U1 and transmit it to the Bluetooth communications module 400 for temperature monitoring. The temperature detecting circuit 204 may include a third resistor R3, a fourth resistor R4, a fifth resistor R5, a sixth resistor R6 and a ninth capacitor C9; one end of the third resistor R3 may be connected to the TEMP pin of the resonance chip U1, one end of the fourth resistor R4 and one end of the fifth resistor R5; one end of the ninth capacitor C9 may be connected to one end of the fourth resistor R4 and the Bluetooth communications module; the other end of the third resistor R3, the other end of the fourth resistor R4, and the other end of the ninth capacitor C9 may be respectively grounded; and the other end of the fifth resistor R5 may be connected to the VLDO terminal of the resonance chip U1, and may be connected to the Bluetooth communications module by means of the sixth resistor R6.

In order to avoid burning the resonance chip U1 off by a large current, the rectifier voltage reduction module 200 further includes a current detecting circuit 205; the current detecting circuit 205 includes a seventh resistor R7; one end of the seventh resistor R7 may be connected to the VRECTS1 terminal and the VRECT terminal of the resonance chip U1, and the other end of the seventh resistor R7 may be connected to the VRECTS2 terminal and the PVIN terminal of the resonance chip U1. Preferably, the seventh resistor R7 has a resistance value of 51 mohm (milliohm) which can improve the accuracy in current detecting.

Figure 3:
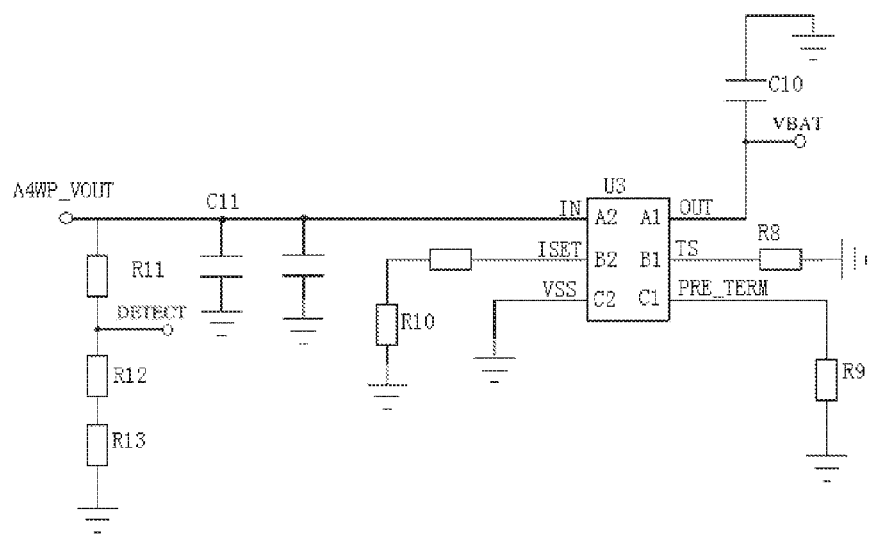
FIG. 3 is a circuit diagram of the power management module in the wireless charging device provided by the present invention.

Referring to FIG. 3, the power management module 300 may include a charging chip U3, an eighth resistor R8, a ninth resistor R9, a tenth resistor R10, an eleventh resistor R11, a twelfth resistor R12, a thirteenth resistor R13, a tenth capacitor C10 and an eleventh capacitor C11; the OUT pin of the charging chip U3 may be connected to the battery and may also grounded by means of the tenth capacitor C10; the TS pin of the charging chip U3 may be grounded by means of the eighth resistor R8; the PRE_TERM pin of the charging chip U3 may be grounded by means of the ninth resistor R9; the ISET pin of the charging chip U3 may be grounded by means of the tenth resistor R10; the VSS pin of the charging chip U3 may be grounded; the IN pin of the charging chip U3 may be connected to the other end of the inductor L and one end of the eleventh resistor R11 and may also be grounded by means of the eleventh capacitor C11; the other end of the eleventh resistor R11 may be connected to one end of the twelfth resistor R12 and the master controller, and the other end of the twelfth resistor R12 may be grounded by means of the thirteenth resistor R13.

In embodiments, because the battery may have a charging voltage range of 0.8V-4.2V, the reference voltage A4WP_VOUT of 5V outputted by the resonance chip U1 needs to be reduced and controlled by means of the charging chip U3, and finally a charging voltage VBAT of 4.2V may be outputted to charge the battery. Before charging, a detection signal DETECT acquired by means of voltage division of the eleventh resistor R11, the twelfth resistor R12 and the thirteenth resistor R13 may be transmitted to the master controller for a charging detection, i.e., indicating that the terminal device is being charged. The charging voltage may be more stable by means of voltage regulation and filtration of the tenth capacitor C10.

The Bluetooth communications module uses a Bluetooth chip having a model of NRF51822 and a peripheral circuit thereof, which pertains to the prior art, and is therefore not described in detail.

In embodiments, the wireless charging device provided by the present invention uses the newest WLCSP (Wafer Level Chip Scale Packaging) technology and uses a resonance chip having a model of MAP7101 to implement the FAR (Full Active Rectifier) technology. Hardware circuits are streamlined in design so that the resonance chip MAP7101 implements the wireless charging function. The wireless charging device may only need to occupy an area of not more than 8 mm×8 mm on the PCB board (the occupied area is very small), and may be easily integrated into an existing portable smart wearable device such as a mobile phone, a smart watch or the like, thereby improving the product competitiveness.

It is to be understood that application of the present invention is not limited to the foregoing examples, those of ordinary skill in the art may make improvements or transformations according to the foregoing description, and all these improvements and transformations should fall within the scope of protection of the appended claims of the present invention.

The invention claimed is:

1. A wireless charging device connected to a charging socket and a battery, the wireless charging device comprising:
   an oscillating module;
   a rectifier voltage reduction module;
   a power management module; and
   a Bluetooth communications module,
   wherein the oscillating module, the rectifier voltage reduction module, and the power management module are sequentially connected,
   wherein the Bluetooth communications module is connected with the rectifier voltage reduction module, and the power management module is connected with the battery,
   wherein a communications connection is established between the Bluetooth communications module and the charging socket via Bluetooth to acquire a charging communications protocol, the oscillating module receives a signal from the charging socket and conducts a magnetic resonance to generate AC, the rectifier voltage reduction module rectifies and reduces a voltage of the AC and then outputs a DC reference voltage, and the power management module reduces the reference voltage and then outputs a charging voltage to charge the battery, and
   wherein the oscillating module comprises:
      a first antenna, a second antenna, a first capacitor, a second capacitor, a third capacitor, a fourth capacitor and a fifth capacitor;
      the first antenna is connected to one end of the first capacitor;
      the other end of the first capacitor is connected to one end of the fifth capacitor and the rectifier voltage reduction module;
      the second capacitor is connected in parallel with the first capacitor;
      the second antenna is connected to one end of the third capacitor;
      the other end of the third capacitor is connected to the other end of the fifth capacitor and the rectifier voltage reduction module; and
      the fourth capacitor is connected in parallel with the third capacitor.

2. The wireless charging device of claim 1, wherein the rectifier voltage reduction module comprises:
   a resonance chip and an inductor;
   an AC+ terminal of the resonance chip is connected to the other end of the first capacitor and one end of the fifth capacitor;
   an AC− terminal of the resonance chip is connected to the other end of the third capacitor and the other end of the fifth capacitor;
   an SW terminal of the resonance chip is connected to one end of the inductor;
   the other end of the inductor is connected to the power management module;
   a TEMP terminal of the resonance chip is connected to the Bluetooth communications module;
   a PVIN terminal of the resonance chip is connected to a power supply terminal; and
   both a PGND terminal and a PGND2 terminal of the resonance chip are grounded.

3. The wireless charging device of claim 2, wherein the rectifier voltage reduction module further comprises:
   a first protection circuit, a second protection circuit, and a detection circuit;
   the detection circuit is connected to the resonance chip, the first protection circuit and the second protection circuit;
   both the first protection circuit and the second protection circuit are respectively connected to the oscillating module; and when the detection circuit detects that a voltage of the resonance chip is greater than a preset voltage, the detection circuit outputs a buck signal to the first protection circuit and the second protection circuit, so that the first protection circuit and the second protection circuit reduce the voltage of the oscillating module.

4. The wireless charging device of claim 3, wherein the first protection circuit comprises:
a first MOS transistor and a sixth capacitor;
a gate of the first MOS transistor is connected to the detection circuit;
a drain of the first MOS transistor is connected to the first antenna and one end of the first capacitor by means of the sixth capacitor; and
a source of the first MOS transistor is grounded.

5. The wireless charging device of claim 4, wherein the second protection circuit comprises:
a second MOS transistor and a seventh capacitor;
a gate of the second MOS transistor is connected to the detection circuit;
a drain of the second MOS transistor is connected to the second antenna and one end of the third capacitor by means of the seventh capacitor; and
a source of the second MOS transistor is grounded.

6. The wireless charging device of claim 5, wherein the detection circuit comprises:
a first resistor, a second resistor, an eighth capacitor and an inverter;
one end of the first resistor is connected to the gate of the first MOS transistor and the gate of the second MOS transistor;
the other end of the first resistor is connected to a B2 pin of the inverter; a B1 pin of the inverter is grounded;
an A1 pin of the inverter is connected to a CLAMP1 terminal of the resonance chip and one end of the second resistor;
an A2 pin of the inverter is connected to the power supply terminal and the other end of the second resistor; and
the A2 pin of the inverter is also grounded by means of the eighth capacitor.

7. The wireless charging device of claim 6, wherein the rectifier voltage reduction module further comprises:
a temperature detecting circuit configured to detect a temperature of the resonance chip and transmit it the temperature of the resonance chip to the Bluetooth communications module for temperature monitoring, and the temperature detecting circuit comprises a third resistor, a fourth resistor, a fifth resistor, a sixth resistor and a ninth capacitor; and wherein:
one end of the third resistor is connected to a TEMP pin of the resonance chip, one end of the fourth resistor and one end of the fifth resistor;
one end of the ninth capacitor is connected to one end of the fourth resistor and the Bluetooth communications module;
the other end of the third resistor, the other end of the fourth resistor, and the other end of the ninth capacitor are respectively grounded; and
the other end of the fifth resistor is connected to a VLDO terminal of the resonance chip, and is connected to the Bluetooth communications module by means of the sixth resistor.

8. The wireless charging device of claim 7, wherein the rectifier voltage reduction module further comprises:
a current detecting circuit; the current detecting circuit comprises a seventh resistor;
one end of the seventh resistor is connected to a VRECTS1 terminal and a VRECT terminal of the resonance chip; and
the other end of the seventh resistor is connected to a VRECTS2 terminal and a PVIN terminal of the resonance chip.

9. The wireless charging device of claim 8, wherein the power management module comprises:
a charging chip, an eighth resistor, a ninth resistor, a tenth resistor, an eleventh resistor, a twelfth resistor, a thirteenth resistor, a tenth capacitor and an eleventh capacitor;
an OUT pin of the charging chip is connected to the battery and is also grounded by means of the tenth capacitor;
a TS pin of the charging chip is grounded by means of the eighth resistor;
a PRE_TERM pin of the charging chip is grounded by means of the ninth resistor;
an ISET pin of the charging chip is grounded by means of the tenth resistor;
a VSS pin of the charging chip is grounded; an IN pin of the charging chip is connected to the other end of the inductor and one end of the eleventh resistor and is also grounded by means of the eleventh capacitor;
the other end of the eleventh resistor is connected to one end of the twelfth resistor and a master controller; and
the other end of the twelfth resistor is grounded by means of the thirteenth resistor.

10. A wireless charging device connected to a charging socket and a battery, the wireless charging device comprising:
an oscillating module;
a rectifier voltage reduction module;
a power management module; and
a Bluetooth communications module,
wherein the oscillating module, wherein the rectifier voltage reduction module, and the power management module are sequentially connected, the Bluetooth communications module is connected with the rectifier voltage reduction module, and the power management module is connected with the battery,
wherein the Bluetooth communications module communicates with the charging socket to acquire a charging communications protocol, the oscillating module receives a signal from the charging socket and oscillates to generate AC, the rectifier voltage reduction module rectifies and reduces the voltage of the AC and then outputs a DC reference voltage, and the power management module reduces the reference voltage and then outputs a charging voltage to charge the battery, and
wherein the rectifier voltage reduction module comprises:
a resonance chip and an inductor;
an AC+ terminal of the resonance chip is connected to a first capacitor of the oscillating module and to a fifth capacitor of the oscillating module;
an AC− terminal of the resonance chip is connected to a third capacitor of the oscillating module and to the fifth capacitor;
an SW terminal of the resonance chip is connected to one end of the inductor;
the other end of the inductor is connected to the power management module;
a TEMP terminal of the resonance chip is connected to the Bluetooth communications module;

a PVIN terminal of the resonance chip is connected to a power supply terminal; and both a PGND terminal and a PGND2 terminal of the resonance chip are grounded.

11. The wireless charging device of the claim 10, wherein the oscillating module comprises:

a first antenna, a second antenna, the first capacitor, a second capacitor, the third capacitor, a fourth capacitor, and the fifth capacitor;

the first antenna is connected to one end of the first capacitor;

the other end of the first capacitor is connected to one end of the fifth capacitor and the rectifier voltage reduction module;

the second capacitor is connected in parallel with the first capacitor; the second antenna is connected to one end of the third capacitor;

the other end of the third capacitor is connected to the other end of the fifth capacitor and the rectifier voltage reduction module; and the fourth capacitor is connected in parallel with the third capacitor.

12. The wireless charging device of claim 10, wherein the rectifier voltage reduction module further comprises:

a first protection circuit, a second protection circuit, and a detection circuit;

the detection circuit is connected to the resonance chip, the first protection circuit and the second protection circuit;

both the first protection circuit and the second protection circuit are respectively connected to the oscillating module; and when the detection circuit detects that a voltage of the resonance chip is greater than a preset voltage, the detection circuit outputs a buck signal to the first protection circuit and the second protection circuit, so that the first protection circuit and the second protection circuit reduce the voltage of the oscillating module.

13. The wireless charging device of claim 12, wherein the first protection circuit comprises:

a first MOS transistor and a sixth capacitor;

a gate of the first MOS transistor is connected to the detection circuit;

a drain of the first MOS transistor is connected to the first antenna and one end of the first capacitor by means of the sixth capacitor; and a source of the first MOS transistor is grounded.

14. The wireless charging device of claim 13, wherein the second protection circuit comprises:

a second MOS transistor and a seventh capacitor;

a gate of the second MOS transistor is connected to the detection circuit; a drain of the second MOS transistor is connected to the second antenna and one end of the third capacitor by means of the seventh capacitor; and a source of the second MOS transistor is grounded.

15. The wireless charging device of claim 14, wherein the detection circuit comprises:

a first resistor, a second resistor, an eighth capacitor and an inverter;

one end of the first resistor is connected to the gate of the first MOS transistor and the gate of the second MOS transistor, the other end of the first resistor is connected to a B2 pin of the inverter;

a B1 pin of the inverter is grounded;

an A1 pin of the inverter is connected to a CLAMP1 terminal of the resonance chip and one end of the second resistor;

an A2 pin of the inverter is connected to the power supply terminal and the other end of the second resistor; and the A2 pin of the inverter is also grounded by means of the eighth capacitor.

16. The wireless charging device of claim 15, wherein the rectifier voltage reduction module further comprises:

a temperature detecting circuit configured to detect a temperature of the resonance chip and transmit the temperature of the resonance chip it to the Bluetooth communications module for temperature monitoring; and the temperature detecting circuit comprises a third resistor, a fourth resistor, a fifth resistor, a sixth resistor and a ninth capacitor, and wherein:

one end of the third resistor is connected to a TEMP pin of the resonance chip, one end of the fourth resistor and one end of the fifth resistor;

one end of the ninth capacitor is connected to one end of the fourth resistor and the Bluetooth communications module;

the other end of the third resistor, the other end of the fourth resistor, and the other end of the ninth capacitor are respectively grounded; and the other end of the fifth resistor is connected to a VLDO terminal of the resonance chip, and is connected to the Bluetooth communications module by means of the sixth resistor.

17. The wireless charging device of claim 16, wherein the rectifier voltage reduction module further comprises:

a current detecting circuit;

the current detecting circuit comprises a seventh resistor;

one end of the seventh resistor is connected to a VRECTS1 terminal and a VRECT terminal of the resonance chip; and the other end of the seventh resistor is connected to a VRECTS2 terminal and a PVIN terminal of the resonance chip.

18. The wireless charging device of claim 17, wherein the power management module comprises:

a charging chip, an eighth resistor, a ninth resistor, a tenth resistor, an eleventh resistor, a twelfth resistor, a thirteenth resistor, a tenth capacitor, and an eleventh capacitor;

an OUT pin of the charging chip is connected to the battery and is also grounded by means of the tenth capacitor;

a TS pin of the charging chip is grounded by means of the eighth resistor;

a PRE_TERM pin of the charging chip is grounded by means of the ninth resistor;

an ISET pin of the charging chip is grounded by means of the tenth resistor;

a VSS pin of the charging chip is grounded;

an IN pin of the charging chip is connected to the other end of the inductor and one end of the eleventh resistor and is also grounded by means of the eleventh capacitor;

the other end of the eleventh resistor is connected to one end of the twelfth resistor and a master controller; and the other end of the twelfth resistor is grounded by means of the thirteenth resistor.

* * * * *